United States Patent
Yalamanchili et al.

(10) Patent No.: US 9,580,106 B2
(45) Date of Patent: Feb. 28, 2017

(54) AUTOMOTIVE FRAME RAIL REINFORCING MEMBER TO MANAGE AN OFFSET, FRONTAL APPLIED LOAD

(71) Applicant: GM GLOBAL TECHNOLOGY OPERATIONS LLC, Detroit, MI (US)

(72) Inventors: Krishnarao V. Yalamanchili, Ann Arbor, MI (US); Mohammed N. Shaik, Canton, MI (US); Terry A. Swartzell, Ann Arbor, MI (US); Jayavardhan Tallapragada, Royal Oak, MI (US); Warren J. Parsons, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/751,680

(22) Filed: Jun. 26, 2015

(65) Prior Publication Data

US 2016/0375936 A1    Dec. 29, 2016

(51) Int. Cl.
*B62D 25/08* (2006.01)
*B62D 21/02* (2006.01)
*B62D 21/15* (2006.01)
*B60R 19/24* (2006.01)

(52) U.S. Cl.
CPC .............. *B62D 21/02* (2013.01); *B60R 19/24* (2013.01); *B62D 21/152* (2013.01)

(58) Field of Classification Search
CPC ....... B62D 21/15; B62D 21/152; B62D 25/08
USPC ................. 296/187.1, 187.09; 293/133, 155
See application file for complete search history.

(56) References Cited

U.S. PATENT DOCUMENTS

| | | | | |
|---|---|---|---|---|
| 3,633,934 A * | 1/1972 | Wilfert | ................. | B62D 21/152 280/784 |
| 5,005,887 A * | 4/1991 | Kelman | ................... | B60R 19/24 293/109 |
| 6,893,078 B2 * | 5/2005 | Saeki | ................... | B62D 21/152 296/187.09 |
| 6,918,621 B2 * | 7/2005 | Seksaria | ................ | B60R 19/34 293/102 |
| 7,066,509 B2 * | 6/2006 | Kollaritsch | ............. | B60R 19/34 293/132 |
| 7,407,206 B2 * | 8/2008 | Arns | ....................... | B60R 19/34 293/133 |
| 8,083,387 B2 * | 12/2011 | Soellner | ............... | B60Q 1/0491 296/187.09 |
| 8,398,152 B1 * | 3/2013 | Mazur | .................. | B62D 21/152 296/187.09 |

(Continued)

*Primary Examiner* — Dennis H Pedder
(74) *Attorney, Agent, or Firm* — Quinn Law Group, PLLC

(57) ABSTRACT

A vehicle includes a body structure and a frame rail assembly. The frame rail assembly extends forward from the bulkhead along a longitudinal centerline. The frame rail assembly includes a frame rail defining a rail axis and a reinforcing member. The frame rail defines a longitudinally extending seam and the frame rail extends forward from the bulkhead along the longitudinal centerline. The frame rail further defines an end portion. The reinforcing member is secured to the frame rail at the end portion to increase a stiffness of the frame rail at the end portion. The reinforcing member is configured to limit a stress at the seam, transverse to the rail axis, resulting from a load applied to the end portion of the frame rail and laterally offset from the longitudinal centerline.

12 Claims, 5 Drawing Sheets

(56) References Cited

U.S. PATENT DOCUMENTS 8,585,129 B2 * 11/2013 Mori .................. B62D 21/152
                                                    296/187.09

* cited by examiner

AUTOMOTIVE FRAME RAIL REINFORCING MEMBER TO MANAGE AN OFFSET, FRONTAL APPLIED LOAD

TECHNICAL FIELD

The disclosure generally relates to a reinforcing member of a frame rail assembly of a vehicle's body structure.

BACKGROUND

Vehicles include some form of a body structure, which often includes a pair of laterally offset frame rails that extend forward from a bulkhead. A bumper structure, including a load bearing beam, may be attached to a forward end of the frame rails. In the event of an offset frontal applied load, in which a load is applied to a forward corner of the vehicle, the applied load may be transmitted or transferred to the adjacent frame rail.

SUMMARY

In one aspect of the disclosure, a vehicle is provided. The vehicle includes a body structure extending along a longitudinal centerline. The body structure includes a bulkhead and a frame rail assembly. The frame rail assembly extends forward from the bulkhead along the longitudinal centerline. The frame rail assembly defines a rail axis extending in laterally spaced relationship to the longitudinal centerline. The frame rail assembly includes a frame rail and a reinforcing member. The frame rail defines a seam extending longitudinally along the rail axis. The frame rail further defines an end portion. The reinforcing member surrounds, and is secured to, the frame rail at the end portion such that a stiffness of the frame rail is increased at the end portion. The reinforcing member is configured to limit a stress at the seam, transverse to the rail axis, resulting from a load applied to the end portion of the frame rail and laterally offset from the longitudinal centerline.

In another aspect of the disclosure, a body structure for a vehicle is provided. The body structure includes a bulkhead, a first frame rail assembly, and a second frame rail assembly. The first and second frame rail assembly each extend forward from the bulkhead along a longitudinal centerline of the body structure. The first frame rail assembly and the second frame rail assembly each define a respective rail axis disposed on opposing lateral sides of the longitudinal centerline. The first and second frame rail assembly each include a frame rail and a reinforcing member. The frame rail defines a seam extending longitudinally along the respective rail axis. The frame rail also defines an end portion. The reinforcing member surrounds, and is secured to, the frame rail at the end portion such that a stiffness of the frame rail is increased at the end portion. The reinforcing member of each of the first frame rail assembly and the second frame rail assembly is configured to limit a stress at the respective seam, transverse to the respective rail axis, resulting from a load applied to the end portion of the respective frame rail and laterally offset from the longitudinal centerline.

Accordingly, the reinforcing members of the frame rail assemblies of the body structure are configured to manage a load applied to a forward corner of the vehicle. In response to an applied longitudinal load being applied by an object to the forward end of the body structure, and laterally offset from the longitudinal centerline of the body structure, the frame rails are configured to maintain their cross-sectional shape for an increased length of time, such that a length of time the longitudinal load is transferred longitudinally along the rail axis is increased.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the disclosure may be described herein in terms of functional and/or logical block components and/or various processing steps. It should be realized that such block components may be comprised of any number of hardware, software, and/or firmware components configured to perform the specified functions.

Figure 1:
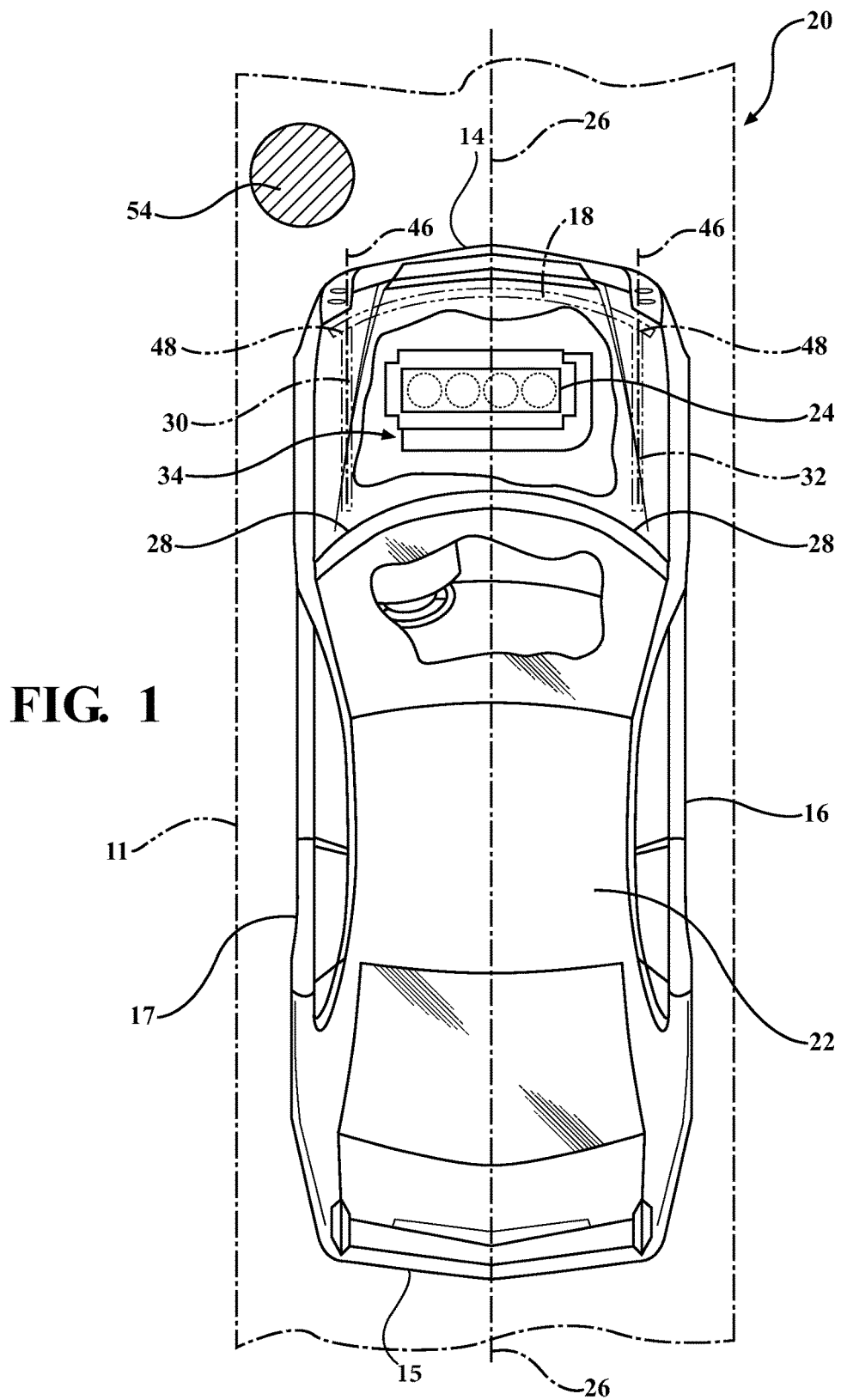
FIG. 1 is a schematic top view of a vehicle including an object aligned with a forward corner of a body structure.

Referring to the Figures, wherein like numerals indicate like parts throughout the several views, FIG. 1 shows a vehicle 20 positioned relative to a road surface 11 in FIG. 1. The vehicle 20 may include any shape, size, and/or style of vehicle 20 that includes a body structure 22, such as but not limited to a sedan, a sport utility vehicle, a truck, van, etc.

Referring to FIG. 1, the body structure 22 of the vehicle 20 supports the various components of the vehicle 20, such as but not limited to a powertrain system 24 (i.e., a drivetrain), wheels, axles, body panels, etc. The body structure 22 defines four body sides. The four body sides include a first or front end 14, a second or rear end 15, a right side 16, and a left side 17, all of which are characterized by exterior panels or surfaces. The rear end 15 is spaced from the front end 14 along a longitudinal axis. The longitudinal axis extends along a longitudinal centerline 26 of the body structure 22. As shown, the front end 14 may include a front bumper assembly 18. As defined herein, the bumper assembly 18 may include inner structures that are covered by exterior panels of the body sides 14, 15, 16, 17. While the body structure 22 is shown schematically in the Figures as a unibody structure 22, it should be appreciated that the body structure 22 may be configured differently than shown in the Figures, such as but not limited to a traditional body on frame structure. The body structure 22 includes a bulkhead 28. A first frame rail assembly 30 and a second frame rail assembly 32 each extend forward from the bulkhead 28 along the longitudinal centerline 26, to a respective forward end 56. The first frame rail assembly 30 and the second frame rail assembly 32 may alternatively be described as a first motor rail and a second motor rail respectively. The first frame rail assembly 30 is laterally offset from the second frame rail assembly 32 on opposing lateral sides of the longitudinal centerline 26. The first frame rail assembly 30 and the second frame rail assembly 32 each define a respective rail axis 46, extending in laterally spaced and generally parallel relationship to the longitudinal centerline 26 of the vehicle 20.

The powertrain system 24 is supported by, and attached to, the body structure 22. The powertrain system 24 is disposed forward of the bulkhead 28, and laterally inboard of the first frame rail assembly 30 and the second frame rail assembly 32, relative to the longitudinal centerline 26 of the body structure 22. As used herein, the term inboard refers to a location relative to the longitudinal centerline 26 of the body structure 22. Accordingly, an inboard feature is located nearer or closer to the longitudinal centerline 26 of the body structure 22 than an outboard feature. The powertrain system 24 may include, but is not limited to, an internal combustion engine, an electric motor, a transmission, a transaxle, or a combination thereof. The components of the powertrain system 24 are rigidly mounted to the body structure 22, such as but not limited to the first frame rail assembly 30 and/or the second frame rail assembly 32.

Figure 2:
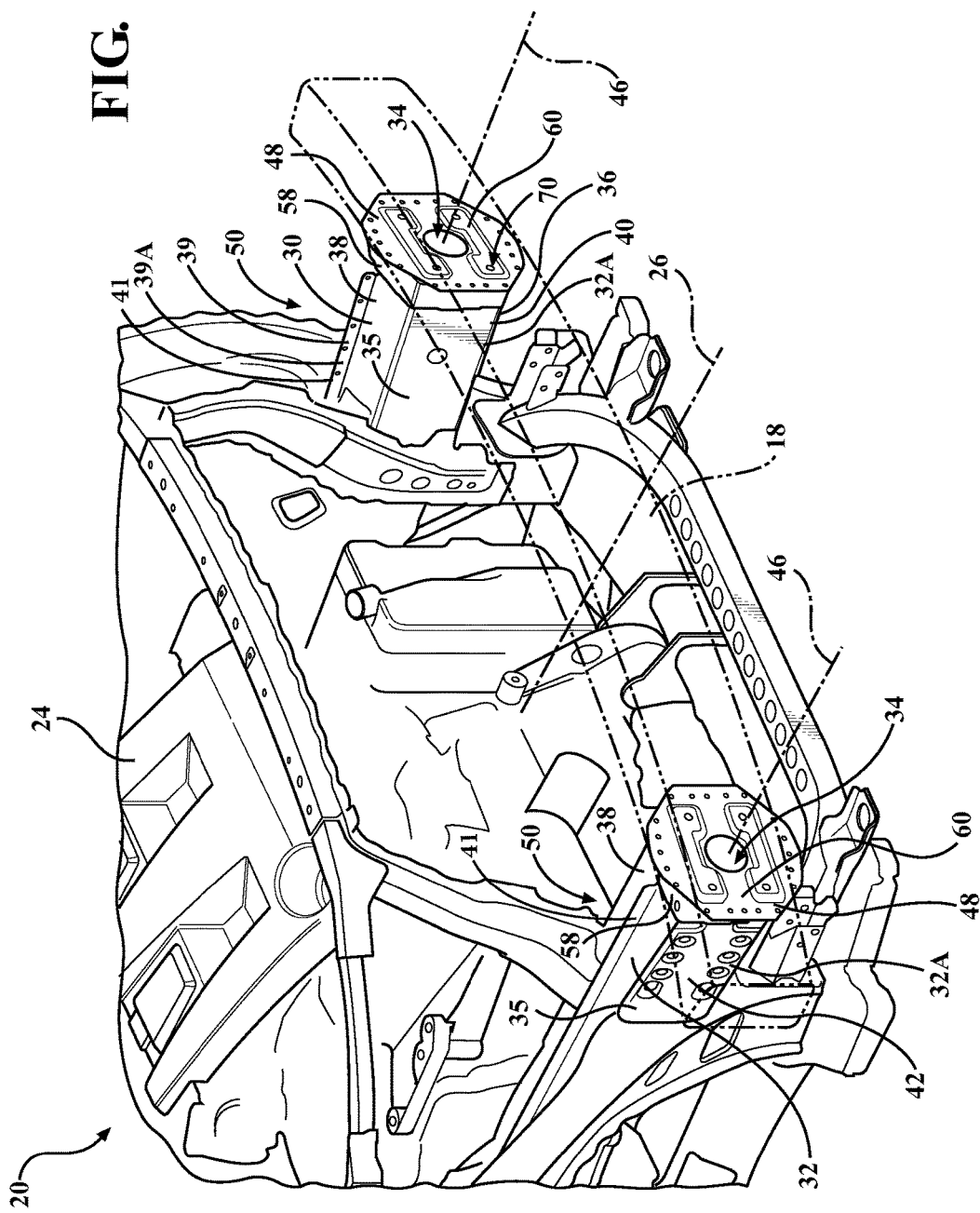
FIG. 2 is a schematic fragmentary perspective view of a front of the body structure of the vehicle including a pair of frame rails with a reinforcing member attached to respective frame rails.
Figures 3, 4:
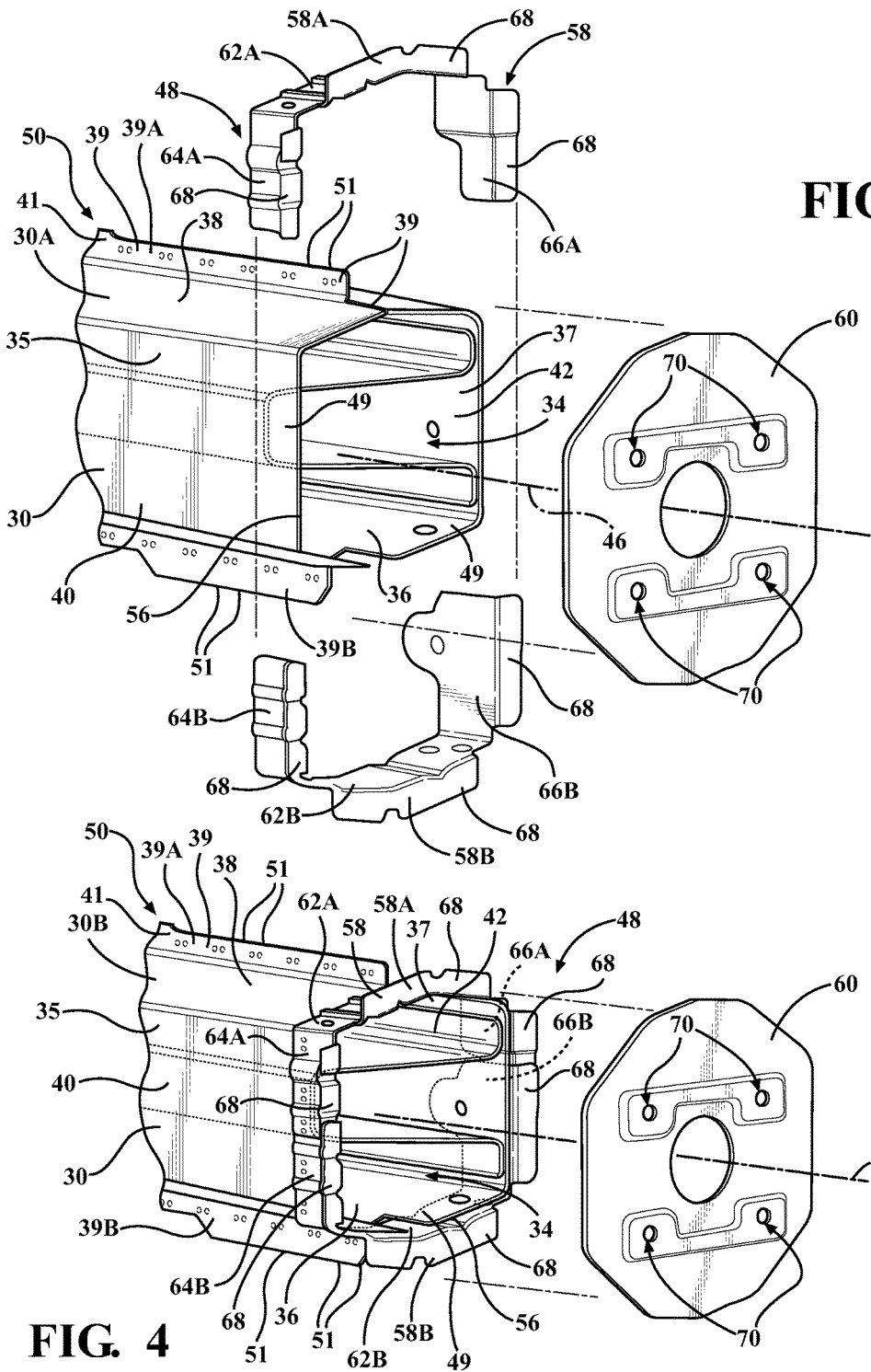
FIG. 3 is a schematic perspective exploded view of the reinforcing member relative to a forward end of one of the frame rails, where the reinforcing member includes a pair of brackets and a plate set apart from the frame rail.
FIG. 4 is a schematic perspective partially exploded view of the reinforcing member with the pair of brackets attached to a forward end of the respective frame rail and the plate set apart from the pair of brackets and the forward end.

Referring to FIG. 2, each of the first frame rail assembly 30 and the second frame rail assembly 32 includes a respective first frame rail 30A and a second frame rail 30B. Each of the first frame rail 30A and the second frame rail 32A provides a tubular structure defining an interior region 34. Each of the first frame rail 30A and the second frame rail 32A includes a first rail section 35 and a second rail section 37, each extending forward from the bulkhead 28 along the longitudinal centerline 26 to the forward end 56. The first rail section 35 is joined to the second rail section 37 along at least one longitudinally extending seam 39. Referring to FIGS. 3 and 4, the first rail section 35 is joined to the second rail section 37 along two longitudinally extending seams 39A, 39B, disposed opposite one another across the interior region 34 and extending in generally parallel relationship to one another. More specifically, a longitudinal edge 51 of the first rail section 35 is joined with a respective longitudinal edge 51 of the second rail section 37 to define the first seam 39A and the other one of the longitudinal edges 51 of the first rail section 35 is joined with the other one of the respective longitudinal edges 51 of the second rail section 37 to define the second seam 39B. The first rail section 37 and the second rail section 39 are joined along the seams 39 to provide a lower wall 36, an upper wall 38, an inboard wall 40, and an outboard wall 42. The lower wall 36 and the upper wall 38 are disposed opposite each other, and are vertically spaced from each other. With continued reference to FIGS. 3 and 4, one of the seams 39 is disposed along the upper wall 38, where the first rail section 35 is joined with the second rail section 37 and the other one of the seams 39 is disposed along the lower wall 36, where the first rail section 35 is joined with the second rail section 37. The first rail section 35 and the second rail section 37 may abut one another such that a flange 41 extends perpendicularly from each of the upper wall 38 and the lower wall 36. As such, the flanges 41 extend away from one another in opposite directions. The seams 39 are formed along the respective flanges 41.

The first rail section 35 extends laterally inboard of the second rail section 37 relative to the longitudinal centerline 26. The first rail section 35 includes the inboard wall 40 and the second rail section 37 includes the outboard wall 42. The inboard wall 40 and the outboard wall 42 are disposed opposite each other, and are laterally spaced from each other such that the inboard wall 40 is disposed laterally inboard of the outboard wall 42.

The lower wall 36, the upper wall 38, the inboard wall 40, and the outboard wall 42, of the first frame rail 30A and the second frame rail 32A respectively, cooperate to define the tubular structure of the first frame rail 30A and the second frame rail 32A. The frame rails 30A, 32A are typically made from steel and the first rail section 35 and the second rail section 37 are joined to one another to form the seams 39 via welding, to provide weld seams. The first rail section 35 and the second rail section 37 are joined to one another along the seams 39 to form a boxed cross-section. It should be appreciated that the frame rails 30A, 32A are not limited to being formed from steel, as any other suitable materials may be used to provide the tubular structure. Additionally, the first rail section 35 and the second rail section 37 are not limited to being attached to one another via welding, as the boxed cross-section may be formed by any appropriate method and/or by using any appropriate fasteners.

With reference to FIG. 2, the first frame rail 30A and the second frame rail 32A are shown having a reinforcing member 48 secured thereto. With reference to FIGS. 3-6, only the first frame rail 30A is shown having the reinforcing member 48 attached thereto. While FIGS. 3-6 only show the first frame rail 30A, it should be appreciated that the second frame rail 32A is constructed in the same manner as the first frame rail 30A, and is substantially a mirror image of the first frame rail 30A. Accordingly, the second frame rail 32A is not shown in detail. However, the written description of the first frame rail 30A and the embodiment of the first frame rail 30A shown in FIG. 3-6 are applicable to the second frame rail 32A. The reinforcing members 48 of the respective frame rails 30A, 32A are operable to provide reinforcement to the seams 39 of the respective frame rails 30A, 32A, in a direction transverse to the longitudinal centerline 26, during a frontal, offset loading event, described in more detail below.

Figure 5:
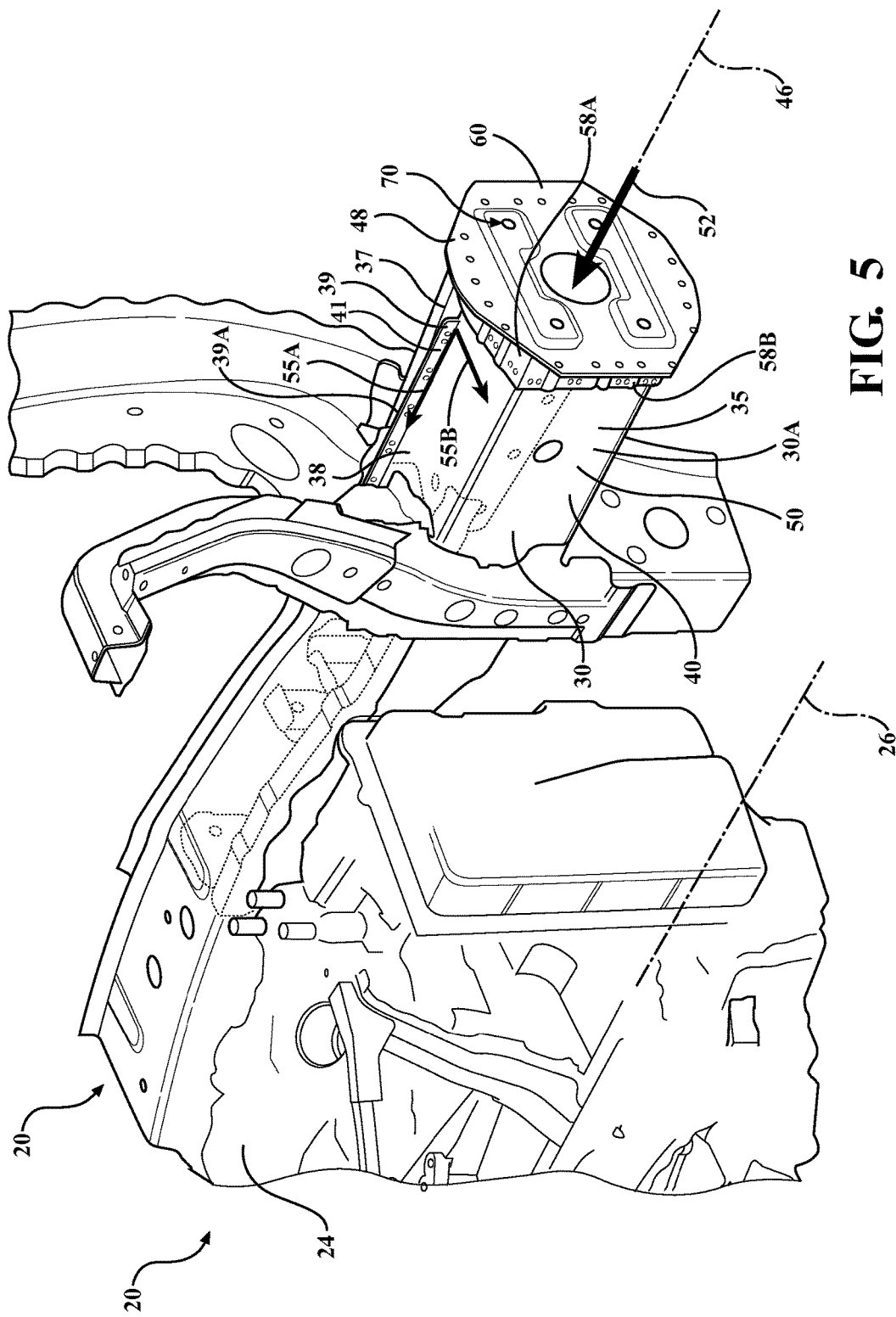
FIG. 5 is a schematic fragmentary perspective view of a first frame rail with the reinforcing member attached to the forward end.

Referring again to FIGS. 3 and 4, a forward section 50 of the frame rail 30A is shown. The reinforcing member 48 includes a collar 58 and a plate 60. With reference to FIG. 4, the collar 58 is secured to an exterior of a end portion 49 of the first frame rail 30A. As such, the collar 58 surrounds the end portion 49 of the first frame rail 30A. Referring now to FIG. 5, the plate 60 is secured to the collar 58, such that the reinforcing member 48 is attached to the end portion 49 of the frame rail 30A. The collar 58 and the plate 60 may be secured to the respective first frame rail 30A and collar 58 by welds, fasteners, and the like.

Referring again to FIGS. 3 and 4, collar 58 includes a first bracket 58A and a second bracket 58B. The first bracket 58A is disposed opposite the second bracket 58B such that the first bracket 58A and the second bracket 58B cooperate to surround the end portion 49 of the first rail section 35 and the second rail section 37. The first bracket 58A and the second bracket 58B may be generally U-shaped to conform to the shape of the exterior of the first frame rail 30A. The first bracket 58A and the second bracket 58B respectively include a base 62A, 62B, a first leg 64A, 64B, and a second leg 66A, 66B. The first leg 64A, 64B and the second leg 66A, 66B extend from the base 62A, 62B in spaced and generally parallel relationship to one another. A portion of each of the first leg 64A and the second leg 66A of the first bracket 58A is disposed in overlapping relationship with a portion of the respective first leg 64B and the second leg 66B of the second bracket 58B to surround the end portion 49 of first frame rail 30A (i.e., the first rail section 35 and the second rail section 37).

A lip 68 extends from the base 62A, 62B, the first leg 64A, 64B, and the second leg 66A, 66B of the first bracket 58A and the second bracket 58B, in transverse relationship to the longitudinal centerline 26. As such, each lip 68 is generally perpendicular to the respective base 62A, 62B, the first leg 64A, 64B, and the second leg 66A, 66B. The plate 60 is secured to the lips 68 of each bracket 58A, 58B such that the plate 60 is oriented vertically, relative to the ground surface 11, and transverse, relative to the longitudinal centerline 26, such as shown by the reinforcing member 48 of FIG. 5.

Figure 6:
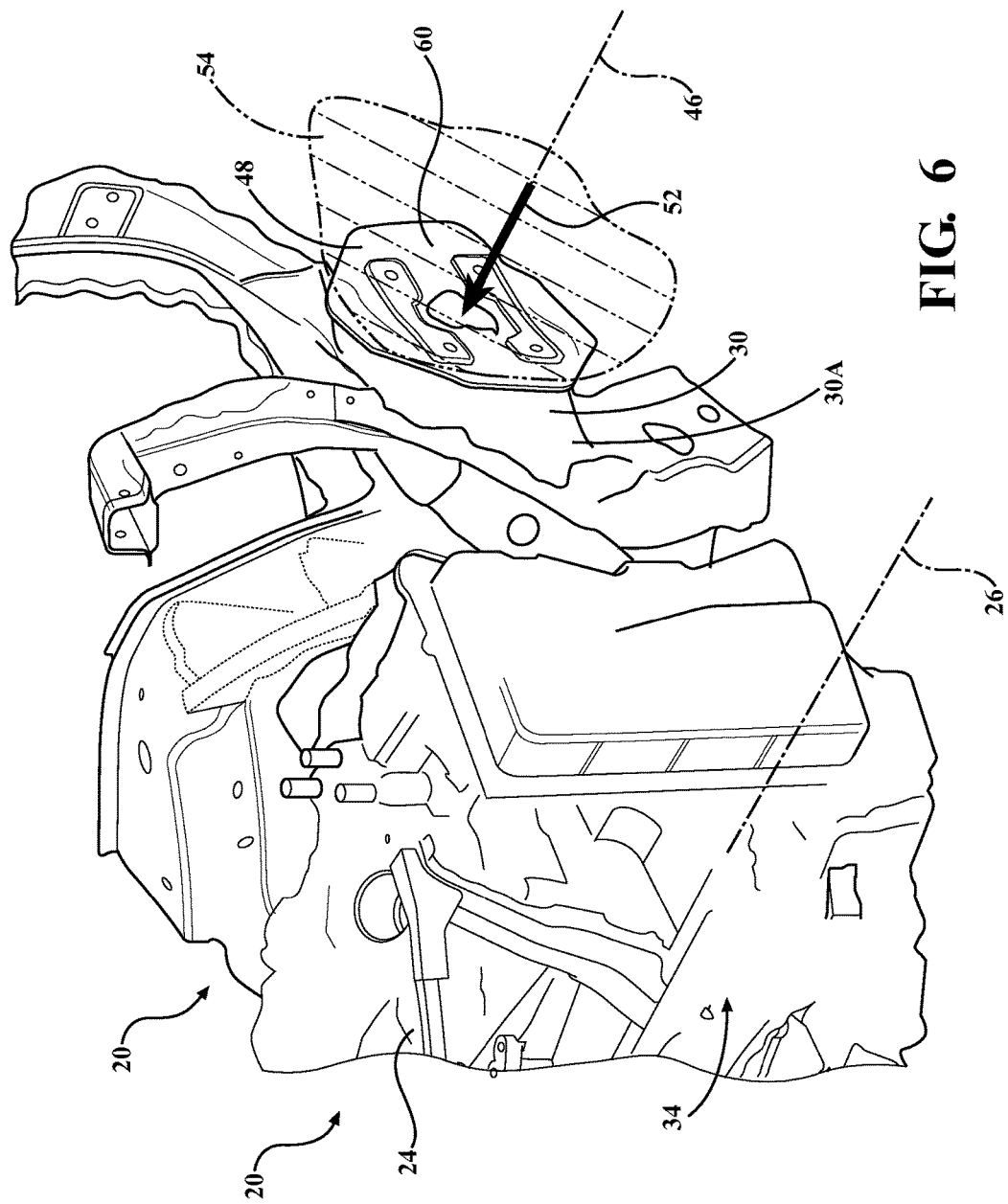
FIG. 6 is a schematic fragmentary perspective view of the first frame rail with the object offset from a center longitudinal axis and the object transferring a load during a frontal, offset loading event.

With reference to FIG. 2, the first and second brackets 58A, 58B surround, and are secured to, the end portion 49 of the respective frame rails 30A, 32A to form the collar 58 and the plate 60 and are secured to the lips 68 of first and second brackets 58A, 58B to provide the reinforcing member 48. Securing the plate 60 to the collar 58 radially restrains the first and second brackets 58A, 58B, since the first and second brackets 58A, 58B radially surround the perimeter of the forward end of the respective frame rail 30A, 32A. As such, the reinforcing members 48 inhibit, or otherwise delay, radial separation of the first and second rail sections 35, 37 from one another, along the respective seams 39, in response to a load 52 applied longitudinally along the rail axis 46 of the frame rail 30A, as illustrated in FIGS. 5 and 6. As such, the frame rail 30A remains capable of absorbing the load 52 during the frontal, offset loading event, in a direction that is generally parallel with the longitudinal centerline 26.

Referring to FIGS. 5 and 6, in the event of the frontal, offset loading event in which a forward corner of the vehicle 20 contacts an object 54, an offset load 52 is applied to the forward corner of the vehicle 20. The load 52 is transferred to the frame rail 30A, along the rail axis 46. Referring specifically to FIG. 5, the reinforcing member 48 is configured to radially restrain the frame rail 30A at the end portion 49, relative to the rail axis 46, to increase the length of time a resultant load 55A is transferred along the rail axis 46 of the frame rail 30A by limiting a secondary load 55B at the seams 39A, 39B that is transverse to the rail axis 46. The secondary load 55B is limited at the seams 39A, 39B by radially restraining the frame rail 30A at the end portion 49 such that the secondary load 55B (i.e., stress forces) along the seams 39A, 39B are limited and the load capacity of the frame rail 30A along the rail axis 46 is maximized. While FIGS. 5 and 6 only show the first frame rail 30A, it should be appreciated that the second frame rail 32A, including the corresponding reinforcing member 48, operates in a similar fashion on the opposing lateral side of the vehicle 20.

Additionally, with reference to FIGS. 1 and 2, not only is the reinforcing member 48 configured to maximize the load capacity of the frame rail 30A, 32A along the rail axis 46, the reinforcing member 48 also provides an attachment location for the front bumper assembly 18. Referring again to FIGS. 2-6, the plate 60 may include a plurality of holes 70 configured to receive fasteners (not shown) for attachment to the front bumper assembly 18. Therefore, in the event of the frontal, offset loading event in which the bumper assembly 18 of a forward corner of the vehicle 20 contacts the object 54, the offset applied load 52 is first applied to the front bumper assembly 18 at the forward corner of the vehicle 20, which transfers the load 52 to the corresponding rail 30A, 32A, by virtue of the location of the front bumper assembly 18 in front of the rail 30A, 32A.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. A vehicle comprising:
a body structure extending along a longitudinal centerline, the body structure including:
a bulkhead;
a frame rail assembly extending forward from the bulkhead along the longitudinal centerline and the frame rail assembly defining a rail axis extending in laterally spaced relationship to the longitudinal centerline, wherein the frame rail assembly includes:
a frame rail including a first rail section and a second rail section, wherein each of the first rail section and the second rail section has a pair of longitudinal edges extending forward from the bulkhead along the rail axis;
wherein one of the longitudinal edges of the first rail section is joined with one of the respective longitudinal edges of the second rail section along a first seam to provide an upper wall, extending longitudinally along the rail axis, and the other one of the longitudinal edges of the first rail section is joined with the other one of the respective longitudinal edges of the second rail section along a second seam to provide a lower wall, extending longitudinally along the rail axis, such that the upper wall and the lower wall are disposed opposite one another;
wherein the first rail section provide an inboard wall and the second rail section provides an outboard wall, such that the inboard wall and the outboard wall are disposed opposite one another and the inboard wall, the outboard wall, the upper wall, and the lower wall cooperate to define a tubular structure having an open interior region;
wherein the first rail section and the second rail section cooperate to define an end portion of the frame rail; and
a reinforcing member surrounding, and secured to, the frame rail at the end portion such that a stiffness of the frame rail is increased at the end portion, wherein the reinforcing member includes;
a collar including a first bracket and a second bracket, each secured to the frame rail at the end portion, such that the first bracket is disposed opposite the second bracket to surround the first rail section and the second rail section about the rail axis;
wherein each of the first bracket and the second bracket includes a base, a first leg, and a second leg, wherein the first leg and the second leg extend from the base in spaced and generally parallel relationship to one another;
wherein the base of the bracket extends across a portion of the first seam of the upper wall and the base of the second bracket extends across a portion of the second seam of the lower wall and wherein a portion of the first leg of the first bracket and a portion of the first leg of the second bracket are disposed in overlapping relationship with one another across the inboard wall; and wherein a portion the second leg of the first bracket and a portion of the second leg of the second bracket are disposed in overlapping relationship with one another across the outboard wall; and a plate extending transverse to the rail axis and secured to the collar;

wherein the collar and the plate are configured to radially restrain the frame rail to limit a stress at the first seam and the second seam, transverse to the rail axis, resulting from a load applied to the end portion of the frame rail and laterally offset from the longitudinal centerline.

2. The vehicle, as set forth in claim 1, wherein the first bracket and the second bracket are U-shaped.

3. The vehicle, as set forth in claim 1, wherein the one of the longitudinal edges of the first rail section is joined with the one of the longitudinal edges of the second rail section to form a flange defining a portion of the first seam and the other one of the longitudinal edges of the first rail section is joined with the other one of the longitudinal edges of the second rail section to form a second flange defining a portion of the second seam; and wherein the first flange and the second flange extend in generally perpendicularly relationship to the respective upper wall and lower wall.

4. The vehicle, as set forth in claim 3, wherein the first bracket and the second bracket each include a lip extending perpendicularly from each of the base, the first leg, and the second leg;

wherein the plate is secured to the lips of each of the first bracket and the second bracket.

5. The vehicle, as set forth in claim 1, further comprising a bumper secured to the plate of the reinforcing member.

6. A body structure of a vehicle, the body structure comprising:
a bulkhead;
a first frame rail assembly and a second frame rail assembly, each extending forward from the bulkhead along a longitudinal centerline of the body, with the first frame rail assembly and the second frame rail assembly each defining a respective rail axis disposed on opposing lateral sides of the longitudinal centerline, wherein each of the first frame rail assembly and the second frame rail assembly includes:
a frame rail including a first rail section and a second rail section, wherein each of the first rail section and the second rail section has a pair of longitudinal edges extending forward from the bulkhead along the rail axis;
wherein one of the longitudinal edges of the first rail section is joined with one of the respective longitudinal edges of the second rail section along a first seam to provide an upper wall, extending longitudinally along the rail axis, and the other one of the longitudinal edges of the first rail section is joined with the other one of the respective longitudinal edges of the second rail section along a second seam to provide a lower wall, extending longitudinally along the rail axis, such that the upper wall and the lower wall are disposed opposite one another;

wherein the first rail section provides an inboard wall, and the second rail section provides an outboard wall, such that the inboard wall and the outboard wall are disposed opposite one another and the inboard wall, the outboard wall, the upper wall, and the lower wall cooperate to define a tubular structure having an open interior region;

wherein the first rail section and the second rail section cooperate to define an end portion of the frame rail; and a reinforcing member surrounding, and secured to, the frame rail at the end portion such that a stiffness of the frame rail is increased at the end portion, wherein the reinforcing member includes;

a collar including a first bracket and a second bracket, each secured to the frame rail at the end portion, such that the first bracket is disposed opposite the second bracket to surround the first rail section and the second rail section about the rail axis;

wherein each of the first bracket and the second bracket includes a base, a first leg, and a second leg, wherein the first leg and the second leg extend from the base in spaced and generally parallel relationship to one another; and a plate extending transverse to the rail axis and secured to the collar;

wherein the collar and the plate of each of the first frame rail and the second frame rail is configured to radially restrain the frame rail to limit a stress at the first seam and the second seam, transverse to the respective rail axis, resulting from a load applied to the end portion of the frame rail and laterally offset from the longitudinal centerline.

7. The body structure, as set forth in claim 6, wherein the first bracket and the second bracket are U-shaped.

8. The body structure, as set forth in claim 6, wherein the one of the longitudinal edges of the first rail section is joined with the one of the longitudinal edges of the second rail section to form a flange defining a portion of the first seam and the other one of the longitudinal edges of the first rail section is joined with the other one of the longitudinal edges of the second rail section to form a second flange defining a portion of the second seam; and wherein the first flange and the second flange extend in generally perpendicularly relationship to the respective upper wall and the lower wall.

9. A vehicle comprising:
a body structure extending along a longitudinal centerline, the body structure including:
a bulkhead;
a frame rail assembly extending forward from the bulkhead along the longitudinal centerline and the frame rail assembly defining a rail axis extending in laterally spaced relationship to the longitudinal centerline, wherein the frame rail assembly includes:
a frame rail including a first rail section and a second rail section, wherein each of the first rail section and the second rail section has a pair of longitudinal edges extending forward from the bulkhead along the rail axis;
wherein one of the longitudinal edges of the first rail section is joined with one of the respective longitudinal edges of the second rail section along a first seam to provide an upper wall, extending longitudinally along the rail axis, and the other one of the longitudinal edges of the first rail section is joined with the other one of the respective longitudinal edges of the second rail section along a second seam to provide a lower wall, extending longitudinally along the rail axis, such that the upper wall and the lower wall are disposed opposite one another;

wherein the one of the longitudinal edges of the first rail section is joined with the one of the longitudinal edges of the second rail section to form a flange defining a portion of the first seam and the other one of the longitudinal edges of the first rail section is joined with the other one of the longitudinal edges of the second rail section to form a second flange defining a portion of the second seam;

wherein the first flange and the second flange extend in generally perpendicular relationship to the respective upper wall and lower wall;

wherein the first rail section includes an inboard wall, and the second rail section includes an outboard wall, such that the inboard wall and the outboard wall are disposed opposite one another, and the inboard wall, the outboard wall, the upper wall, and the lower wall cooperate to define a tubular structure having an open interior region;

wherein the first rail section and the second rail section cooperate to define an end portion of the frame rail; and a reinforcing member surrounding, and secured to, the frame rail at the end portion such that a stiffness of the frame rail is increased at the end portion, wherein the reinforcing member includes;

a collar including a first bracket and a second bracket, each secured to the frame rail at the end portion, such that the first bracket is disposed opposite the second bracket to surround the first rail section and the second rail section about the rail axis;

wherein each of the first bracket and the second bracket includes a base, a first leg, a second leg, and a lip, wherein the first leg and the second leg extend from the base in spaced and generally parallel relationship to one another, and the lip extends perpendicularly from each of the base, the first leg, and the second leg; and a plate extending transverse to the rail axis and secured to the collar;

wherein the collar and the plate are configured to radially restrain the frame rail to limit a stress at the first seam and the second seam, transverse to the rail axis, resulting from a load applied to the end portion of the frame rail and laterally offset from the longitudinal centerline.

10. The vehicle, as set forth in claim 9, wherein the base of the bracket extends across a portion of the first seam of the upper wall and the base of the second bracket extends across a portion of the second seam of the lower wall and wherein a portion of the first leg of the first bracket and a portion of the first leg of the second bracket are disposed in overlapping relationship with one another across the inboard wall and wherein a portion the second leg of the first bracket and a portion of the second leg of the second bracket are disposed in overlapping relationship with one another across the outboard wall.

11. The vehicle, as set forth in claim 9, wherein the first bracket and the second bracket are U-shaped.

12. The vehicle, as set forth in claim 9, wherein the plate is secured to the lips of each of the first bracket and the second bracket.

* * * * *